July 12, 1938.　　　　C. H. ANTRIM　　　　2,123,395
GAUGE
Filed June 20, 1935　　　2 Sheets-Sheet 1

Witness:
Geo. L. Chapel

Charles H. Antrim
INVENTOR.
BY Ring and Ring
ATTORNEYS.

July 12, 1938.  C. H. ANTRIM  2,123,395
GAUGE
Filed June 20, 1935   2 Sheets-Sheet 2

Witness:
Geo L. Chapel

Charles H. Antrim
INVENTOR.

BY Rice and Rice
ATTORNEYS.

Patented July 12, 1938

2,123,395

UNITED STATES PATENT OFFICE 2,123,395

GAUGE

Charles H. Antrim, Grand Rapids, Mich.

Application June 20, 1935, Serial No. 27,527

1 Claim. (Cl. 73—109)

The present invention relates to gauges, particularly such as are employed for measuring fluid pressures; and more particularly, such pressure gauges as are used in connection with oil burner installations for measuring by fluid pressure the amount of fuel oil in the tanks of such installations; and its objects are to provide such a gauge which may be very accurately and readily adjusted to the tank capacity of such installations; to provide such a gauge having a great range of gauging capacity; to provide such a gauge which may be applied to such tanks of widely different capacity; to provide in such a gauge means for preventing confusion and error in reading the same; and further, to provide in such a gauge a scale with graduation and indicia which are very distinctly displayed.

These and any other and more specific objects hereinafter appearing are attained by, and the invention finds preferable embodiment in, the gauge and structures particularly described in the body of this specification and illustrated by the accompanying drawings, in which.

Figure 5:
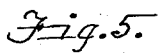
Figure 5 is a sectional view thereof taken on radial line 5—5 of Figure 1.
Figure 6:
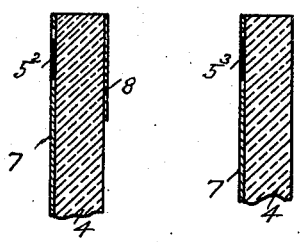
Figure 6 is a sectional view of the same taken on radial line 6—6 of Figure 3.
Figure 4:
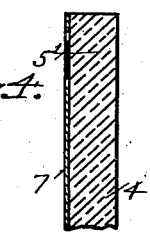
Figure 4 is a sectional view of the scale plate taken on radial line 4—4 of Figure 1.
Figure 7:
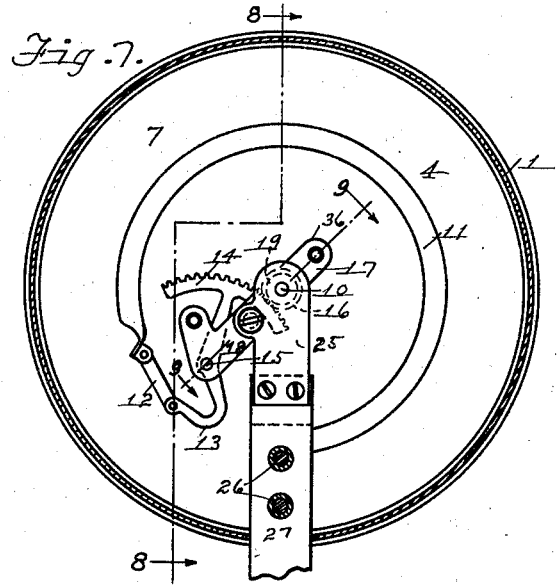
Figure 7 is a sectional view of the gauge taken on line 7—7 of Figure 8.

In the particular embodiment of the invention which is illustrated by these drawings, the gauge comprises an axially horizontal cylindrical casing 1 including the hollow body 2 and its annular cap 3 provided with a transparent window pane 4 which forms the scale plate displaying the scale 5 which extends in an arc 6 of a circle and includes the graduation, the numerical indicia 1, 2, 3, 4, 5, 6, 7, 8 painted or otherwise applied to the inner side of said pane or scale plate, the numerals 2 and 5 being also indicated at $5^1$, $5^2$ and $5^3$ in Figures 4, 5 and 6 respectively. The inner side of this plate, except for the arc 6 displaying said indicia, is obscured or coated at 7 as by the decalcomania process for more distinctly displaying said indicia. A removable blind or covering 8 conceals the indicia at one end of the scale, as the numerals 5, 6, 7, 8, this blind being, as shown, an opaque coating applied, as by like decalcomania process, on the outer side of the scale plate 4.

An indicator or pointer 9 is carried on a rotatable shaft 10, which with the pointer is rotated to indicate on the scale degrees of force or pressure to be gauged or measured.

Figure 11:
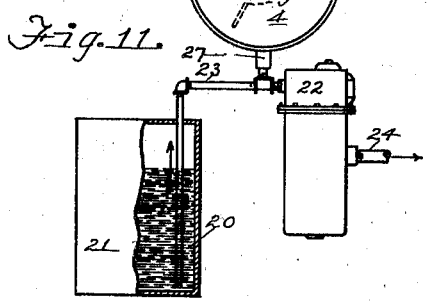
Figure 11 is an elevational view (reduced) of the gauge as applied to an oil burner installation.

In the illustrative practical application of the gauge shown by the drawings, the shaft and pointer are rotated by the flexible hollow diaphragm member 11 to indicate the amount of fuel oil 20 in the tank 21 of an oil burner installation illustrated in Figure 11, the numerical graduation on the scale being arranged to indicate depth in feet of the oil in the tank or hundreds of gallons of oil therein. Said member 11 leads from the rigid pipe 27 (on which the gauge is mounted as by screws 26) and has its free end connected by a link 12 with the arm 13 of a toothed sector 14 meshing with the shaft's pinion 16 and pivoted at 15 on the arm 18 of a bar 36 comprising parallel plates 17. This bar is turnably mounted at 19 on a support 25. This diaphragm member is flexed to move the pointer by the suction or pressure withdrawal of oil from the tank.

Figure 1:
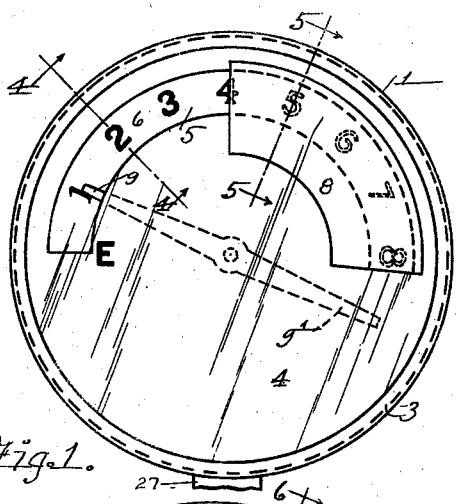
Figure 1 is a front or face view of the gauge.
Figure 2:
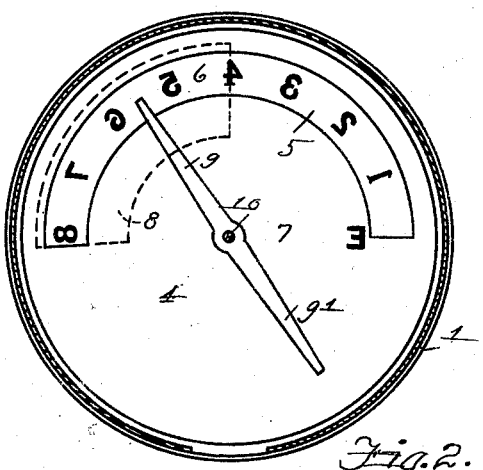
Figure 2 is a sectional view thereof taken on line 2—2 of Figure 8, showing the inner side of the scale plate.

In practice, the tank, which in Figure 11 is adapted to hold 400 gallons or a depth of four feet of oil, is first filled and the pointer is rotated, as hereinafter explained, to the numeral 4 of the scale. The pump indicated at 22 being started to draw oil from the tank through the pipe 23 and propel it through the pipe 24 leading to the oil burner (not shown), the pointer is caused to move toward the initial end of the scale by the diminishing pressure which is communicated to the diaphragm member through the pipe 27 connected with pipe 23 between the tank and the pump. When enough oil is withdrawn from the tank to leave say one foot in depth or 100 gallons therein, the pointer will indicate the numeral 1 as shown in Figure 1.

The pointer is rotated manually, to initially adjust its position relatively to the size of the tank of the particular installation, by a screw driver passed through the opening 30 in the back of the casing and into the kerf 31 of the short spindle 32 frictionally held turnably in a bearing 33 in the support 25, and thus turning said spindle which has an eccentric pin 34 engaging in a slot bearing 35 in the arm 18 of the bar 36. This action turns said bar on its pivotal mounting 19, the sector 14 on its pivot 15 and the pointer's shaft, the diaphragm member 11 remaining unmoved.

The tanks for oil burner installations for domestic use usually contain from 400 to 800 gallons.

To employ for a large tank the same diaphragm member 11, which is intended and adapted for use in connection with a much smaller tank, may result in such member's being flexed in actual use to degrees which may impair its proper operation. Such danger is at least partially obviated by turning the bar 36 to adjusted positions as above explained; and I have provided means for adapting the device to extreme differences in capacity of the tanks. I provide the toothed sector 14 of such angular extent, as shown, that its turning movement on the pivot 15 may rotate the pointer more than 360 degrees. My gauge may therefore be applied to such installations having tanks of say 400 to 800 gallons capacity; and I provide a second pointer 9¹ disposed at the same angular distance on its shaft from the pointer 9 as equals the angular extent of the scale. Thus, in the construction illustrated, the scale extends through 180 degrees and I dispose the pointers 9, 9¹ at that same angular distance apart. Inasmuch as the pointer's shaft may be turned either way in making said adjustment, the double pointer is advantageous and convenient for either may be in use while the other is concealed by the coating 7.

Figure 3:
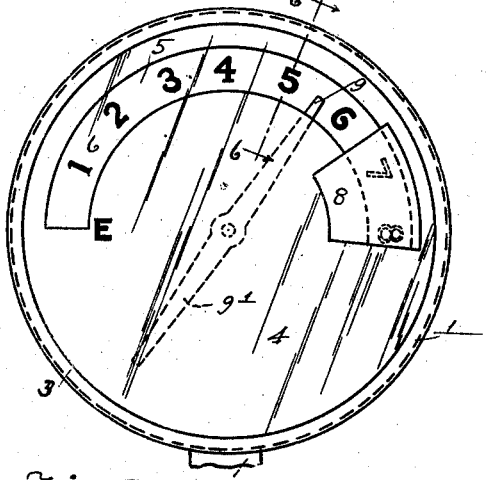
Figure 3 is a front or face view of the gauge showing a portion of the indicia-blind removed.

The blind or covering 8 with which the gauge is initially furnished covers the indicia numerals 5, 6, 7, 8 as shown in Figure 1 and is thus adapted for use in connection with a tank of 400 gallons capacity. If however, the purchaser's tank holds 800 gallons, he may remove or scrape off the entire blind, or if his tank holds 650 gallons he may remove all but that portion of the blind which covers the numerals 7, 8 as indicated in Figure 3.

The concealing or covering of indicia not to be used in any given installation prevents confusion and a misreading of the gauge.

Figure 8:
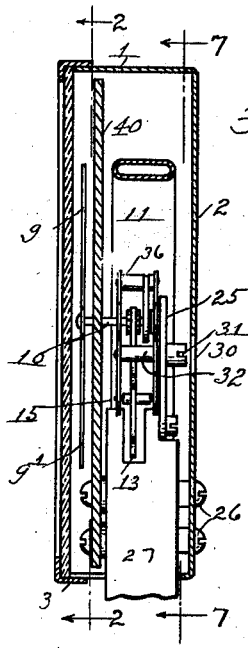
Figure 8 is a sectional view thereof taken on line 8—8 of Figure 7.
Figure 9:
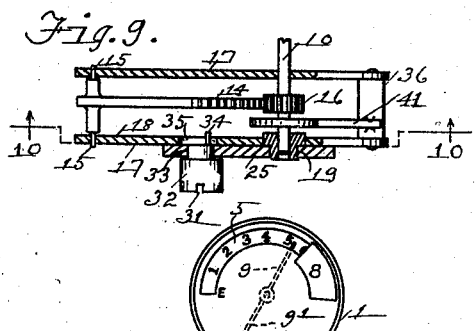
Figure 9 is a sectional view of parts of the same taken on line 9—9 of Figure 7.
Figure 10:
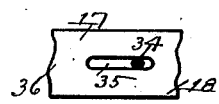
Figure 10 is a fragmentary sectional view of certain parts of the same taken on line 10—10 of Figure 9.

A disc 40 may be mounted behind the pointer as shown in Figure 8 and colored or made reflective to more distinctly display the indicia numerals. A light spiral spring wound on the shaft 10 is shown at 41.

Where the plate 4 is coated on its inner side as shown at 7 and the indicia or numerals are painted on said inner side, while the blind 8 is formed by coating this plate on its outer side, it is evident that the blind may be removed or scraped off without marring the indicia or the coating 7.

The gauge being operated by changes of pressure in the tank, it will be seen that it is adapted to varying "lifts" of the oil depending on the depth of the tank below the gauge, so that the gauge may be employed in installations in which the vertical distance between it and the tank varies greatly.

The invention being intended to be pointed out in the claim, is not to be limited to or by details of construction or arrangement of any particular embodiment thereof illustrated by the drawings or hereinbefore described.

I claim:

In a gauge: an arcuate scale extending one hundred and eighty degrees; an indicator comprising a rotatable shaft having a pinion and carrying a pair of diametrically opposite pointers; a curved hollow diaphragm member operated by fluid pressure therein to rotate the shaft; and adjustable means for operatively connecting said member with the shaft comprising an arm turnable relatively to the shaft to adjusted positions and a toothed sector pivoted on the arm, meshing with the pinion and connected with said member, the sector and the pinion having a gear ratio sufficient to rotate the shaft a complete revolution to every one complete turning movement of the sector in either direction to bring only one or the other of the pointers into operative registration with the scale.

CHARLES H. ANTRIM.